United States Patent
Zhou et al.

(10) Patent No.: US 11,798,548 B2
(45) Date of Patent: Oct. 24, 2023

(54) SPEECH RECOGNITION METHOD, APPARATUS, DEVICE AND READABLE STORAGE MEDIUM

(71) Applicant: APOLLO INTELLIGENT CONNECTIVITY (BEIJING) TECHNOLOGY CO., LTD., Beijing (CN)

(72) Inventors: Yi Zhou, Beijing (CN); Qie Yin, Beijing (CN); Long Zhang, Beijing (CN); Zhen Chen, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 259 days.

(21) Appl. No.: 17/128,994

(22) Filed: Dec. 21, 2020

(65) Prior Publication Data

US 2021/0193143 A1  Jun. 24, 2021

(30) Foreign Application Priority Data

May 15, 2020 (CN) .......................... 202010414058.6

(51) Int. Cl.
*G10L 15/22* (2006.01)
*G06F 16/2458* (2019.01)
(Continued)

(52) U.S. Cl.
CPC .......... *G10L 15/22* (2013.01); *G06F 16/2468* (2019.01); *G06F 16/3344* (2019.01); *G10L 15/26* (2013.01); *G10L 25/51* (2013.01)

(58) Field of Classification Search
CPC .......... G10L 15/22; G10L 15/26; G10L 25/51; G10L 2015/223; G10L 15/18;
(Continued)

(56) References Cited

U.S. PATENT DOCUMENTS

| 10,978,069 B1* | 4/2021 | McCraw .............. G10L 15/1815 |
| 2016/0125874 A1 | 5/2016 | Yong et al. |
| 2019/0066660 A1 | 2/2019 | Liang et al. |

FOREIGN PATENT DOCUMENTS

| CN | 103456297 A | 12/2013 |
| CN | 105489220 A | 4/2016 |

(Continued)

OTHER PUBLICATIONS

CN-109036420A—translation (Year: 2018).*
(Continued)

*Primary Examiner* — Daniel C Washburn
*Assistant Examiner* — Athar N Pasha
(74) *Attorney, Agent, or Firm* — DILWORTH IP, LLC

(57) ABSTRACT

The present application discloses a speech recognition method, apparatus, device and readable storage medium, and relates to the technical field of artificial intelligence. A specific implementation includes: an electronic device recognizes a speech signal to obtain a first text; if a first pinyin sequence corresponding to the first text exists in the database, the electronic device uses a correct text corresponding to the first pinyin sequence as the speech recognition result; otherwise, the electronic device performs a fuzzy matching on the first pinyin sequence to obtain multiple second pinyin sequences and second texts corresponding to the second pinyin sequences, and selects the speech recognition result from the multiple second texts.

14 Claims, 6 Drawing Sheets

(51) Int. Cl.
*G06F 16/33* (2019.01)
*G10L 15/26* (2006.01)
*G10L 25/51* (2013.01)

(58) Field of Classification Search
CPC .............. G06F 16/334; G06F 16/2468; G06F 16/3344; G06F 40/129; G06F 16/3346
See application file for complete search history.

(56) References Cited

FOREIGN PATENT DOCUMENTS

| | | | | |
|---|---|---|---|---|
| CN | 109036420 A | * | 12/2018 | ........... G10L 15/187 |
| CN | 109036420 A | | 12/2018 | |
| CN | 109994103 A | | 7/2019 | |
| CN | 110619879 A | | 12/2019 | |
| CN | 110866100 A | | 3/2020 | |
| CN | 111079386 A | | 4/2020 | |
| JP | 2013225115 A | | 10/2013 | |
| JP | 2016091028 A | | 5/2016 | |

OTHER PUBLICATIONS

European Search Report in EP Patent Application No. 20214631.2 dated Mar. 31, 2021.
First Office Action in JP Patent Application No. 2020-206159 dated Sep. 8, 2022.
Huang et al., I-vector Clustering Dictionary and Attention Mechanism Framework for Speaker Adaptation, Journal of Chinese Computer Systems, vol. 40, No. 2, 2019, pp. 460-464.
Gaikwad et al., A Review on Speech Recognition Technique, International Journal of Computer Applications, vol. 10, No. 3, Nov. 2010, pp. 16-24.
First Office Action in CN Patent Application No. 202010414058.6 dated Feb. 28, 2023.

* cited by examiner

SPEECH RECOGNITION METHOD, APPARATUS, DEVICE AND READABLE STORAGE MEDIUM

CROSS-REFERENCE TO RELATED APPLICATIONS

This application claims priority to Chinese Patent Application No. 202010414058.6, filed on May 15, 2020 and entitled "SPEECH RECOGNITION METHOD, APPARATUS, DEVICE AND READABLE STORAGE MEDIUM", which is hereby incorporated by reference in its entirety.

TECHNICAL FIELD

Embodiments of the present application relate to artificial intelligence (AI), and in particular to a speech recognition method, apparatus, device and readable storage medium.

BACKGROUND

With the rapid development of artificial intelligence, speech recognition technology has been widely applied to products, such as mobile phones and in-vehicle terminals. Speech recognition technology is essentially a process of converting a user's speech into characters and executing corresponding instructions based on the characters.

Due to issues such as differences in personal pronunciation and regional spoken languages, misrecognition is likely to occur when speech recognition technology is used to recognize speech. For example, a speech signal of "右座位加热 (which means, heating the right seat)" sent by a user is recognized into a text of "有座 位加热 (which means, there is a seat heating)". A misrecognition is called a bad case. In order to avoid misrecognition, a common practice is to create a correction file. Whenever a new bad case is found, a corresponding relationship between the bad case and a correct result of the bad case is added to the correction file. The correction file is packaged in the installation package of an application that has speech recognition function, for users to download and install. Then, when a user uses the speech recognition function of the application installed on a terminal device, if misrecognition occurs, the terminal device will find a correct result from the correction file to improve the accuracy of speech recognition.

SUMMARY

The embodiments of the present invention provide a speech recognition method, apparatus, device and readable storage medium.

In a first aspect, an embodiment of the present application provides a speech recognition method, including: an electronic device obtains a first text by recognizing an acquired speech signal, performs a database search through using a first pinyin sequence corresponding to the first text, and performs a fuzzy search according to the first pinyin sequence in response to the first pinyin sequence not being found in the database, where the fuzzy search is used to look up a second pinyin sequence having at least one pinyin in the first pinyin sequence and the second text corresponding to the second pinyin sequence, and selects at least one second text obtained by the fuzzy search as a speech recognition result of the speech signal.

In a second aspect, an embodiment of the present application provides a speech recognition apparatus, including:

a recognition module, configured to obtain a first text by recognizing an acquired speech signal;

a searching module, configured to perform a database search by using a first pinyin sequence corresponding to the first text;

a matching module, configured to perform a fuzzy search according to the first pinyin sequence in response to the first pinyin sequence not being found in the database, where the fuzzy search is used to look up a second pinyin sequence having at least one pinyin in the first pinyin sequence and a second text corresponding to the second pinyin sequence;

a determining module, configured to select at least one second text obtained by the fuzzy search as a speech recognition result of the speech signal.

In a third aspect, an embodiment of the present application provides an electronic device, including:

at least one processor; and a memory, communicatively connected with the at least one processor; where the memory stores instructions executable by the at least one processor, and the instructions when executed by the at least one processor, enable the at least one processor to execute the method of the first aspect or various possible implementation manners of the first aspect.

In a fourth aspect, an embodiment of the present application provides a computer program product containing instructions, which when running on an electronic device, enable an electronic device computer to execute the method of the first aspect or various possible implementation manners of the first aspect.

In a fifth aspect, an embodiment of the present application provides a non-transitory computer-readable storage medium storing computer instructions, which are used to enable the electronic device to execute the method of the first aspect or various possible implementation manners of the first aspect.

In a sixth aspect, an embodiment of the present application provides a speech recognition method, including: recognizing a speech signal to obtain a first text, performing a fuzzy matching according to a first pinyin sequence corresponding to the first text to obtain multiple second pinyin sequences and second texts corresponding to the second pinyin sequences, where each of the second pinyin sequences has at least one pinyin in the first pinyin sequence, and determining the speech recognition result of the speech signal from the multiple second texts.

It should be understood that the content described in this section is not intended to identify key or important features of the embodiments of the present disclosure, nor is it intended to limit the scope of the present disclosure. Other features of the present disclosure will become easy to be understood through the following description.

BRIEF DESCRIPTION OF DRAWINGS

The drawings are used for better understanding the solution, but do not constitute a limitation to the application, where.

DESCRIPTION OF EMBODIMENTS

Figure 1:
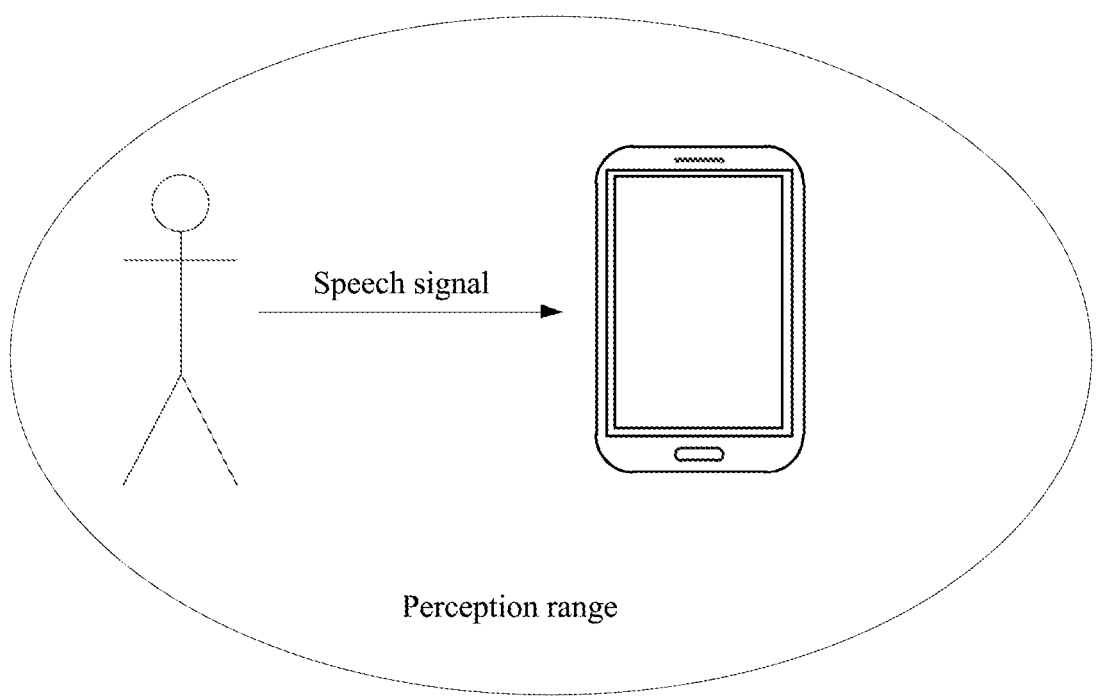
FIG. 1 is a schematic diagram of an environment of a speech recognition method provided by an embodiment of the present application.

The following describes exemplary embodiments of the present application in conjunction with the drawings, which include various details of the embodiments of the present application to facilitate understanding, and should be considered as merely exemplary. Therefore, those of ordinary skill in the art should recognize that various changes and modifications can be made to the embodiments described herein without departing from the scope and spirit of the present application. Similarly, for clarity and conciseness, descriptions of well-known functions and structures are omitted in the following description.

At present, more and more electronic products have speech recognition functions, such as voice assistants, smart speakers, in-vehicle terminals, etc. In a process of speech recognition, misrecognition is likely to occur due to regional spoken languages, etc., and a misrecognition is called a bad case. For example, the speech sent out by a use is "右座位加热 (which means, heating the right seat)", and the electronic product recognizes it as "有座位加入 (which means, there is a seat to join)"; for another example, the speech sent out by a user is "吸烟模式 (which means, smoking mode)", and the electronic product recognizes it as "先模式 (which means, former mode)". Conventional processing methods for avoiding misrecognition include creating a correction file and training a speech recognition engine.

In the method of creating a correction file, the correction file is created in an installation package of a voice assistant, etc. The correction file saves a corresponding relationship between bad cases and correct results. Every time a new bad case is found, a corresponding relationship between the new bad case and a correct result of the bad case is added to the correction file. This method requires constant release of new versions, which is not conducive to version maintenance. Moreover, there are thousands or more commands in a command list for some industries, such as the automobile industry, and the command lists of different models of cars from different manufacturers are different, which causes that the correction file cannot cover the bad cases of various commands. When misrecognition occurs, if the correct result is not added to the correction file, the speech recognition engine cannot recognize the speech sent out by the user.

In the method of training a speech recognition engine, a large number of samples are used to train the speech recognition engine, so that the speech recognition engine can distinguish whether the user sends out "右座位加热 (which means, heating the right seat)" or "有座位加热 (which means, there is a seat heating)", etc. Similarly, due to the large number of commands in the command list, if the training is performed with the bad cases of all the commands, it will cost a lot of manpower and material resources.

In view of this, the embodiments of the present application provide a speech recognition method, apparatus, device and readable storage medium, which can automatically correct misrecognition, thereby improving the accuracy of speech recognition.

First of all, the terms involved in the embodiments of the present application are explained.

First text: Chinese phrases obtained by a speech recognition engine on an electronic device through recognizing a speech signal. For example, when a speech signal sent out by a user is "吸烟模式 (which means, smoking mode)", if the user does not have a regional accent, that is, the user's Mandarin is very standard, the first text obtained by the speech recognition engine through recognizing the speech signal is "吸烟模式"; if the user's Mandarin is not standard, the first text obtained by the speech recognition engine through recognizing the speech signal is "先模式 (which means, former mode)".

Second text: a text obtained by a fuzzy search when a first pinyin sequence corresponding to the first text does not exist in the database. A second pinyin sequence corresponding to the second text contains at least one pinyin in the first pinyin sequence.

Third text: when the first pinyin sequence corresponding to the first text exists in the database, the correct text corresponding to the first pinyin sequence is the third text. When the electronic device does not misrecognize, the third text is the same as the first text; when the electronic device misrecognizes, the third text is different from the first text. If the third text also has a generalized text, the first pinyin sequence also corresponds to multiple generalized texts. For example, when the first pinyin sequence is "you zuo wei jia re", the corresponding correct text is "右座位加热", and the generalized text is "有座位加热".

Generalized text: a wrong result obtained by a speech recognition engine through recognizing a speech. For example, a user originally wants to express "右座 位加热", but due to the non-standard Mandarin, regional accent, etc., the speech sent out by the user is incorrectly recognized by the speech recognition engine as "有座位 加 热". In the embodiments of the present application, the pinyin sequence corresponding to the correct text and the pinyin sequence corresponding to the generalized text may be the same or similar.

Database: a local database of an electronic device, used to store a correspondence relationship between a correct text and a pinyin sequence, and a generalized text of the correct text. Some correct texts have a generalized text, and some correct texts do not have a generalized text. When a correct text has a generalized text, there is at least one generalized text of the correct text, and the generalized text is the text with a same intent as the correct text. Exemplary, please refer to Table 1.

TABLE 1

| Pinyin sequence | Correct text (Third text) | Generalized text |
| --- | --- | --- |
| xi yan mo shi | 吸烟模式(which means, smoking mode) | 先模式(which means, former mode)<br>西安模式(which means, Xi' an mode) |
| you zuo wei jia re | 右座位加热(which means, heating the right seat) | 有座位加热(which means, there is a seat heating)<br>油作为加热 (which means, oil as heating)<br>油作为加热 (which means, oil seat heating) |

TABLE 1-continued

| Pinyin sequence | Correct text (Third text) | Generalized text |
|---|---|---|
| zeng jia kong tiao wen du | 增加空调温度(which means, increasing air conditioning temperature) | |

Please refer to Table 1. For example, the correct text is "吸烟模式", the corresponding pinyin sequence is "xi yan mo shi", and the generalized text stored in the generalization table includes "先模式", "西安模式", etc.

For in-vehicle terminals, the database is, for example, the command list of different models of cars from various manufacturers, etc.

FIG. 1 is a schematic diagram of an environment of a speech recognition method provided by an embodiment of the present application. Please refer to FIG. 1. A user sends out a speech signal within a speech perception range of an electronic device, and the electronic device acquires the speech signal and recognizes the acquired speech signal to obtain a first text, and converts the first text into a first pinyin sequence. If the first pinyin sequence exists in the database, a third text corresponding to the first pinyin sequence is used as a speech recognition result. If the first pinyin sequence does not exist in the database, at least one second text is obtained through a fuzzy search, and one or more of the at least one second text is or are used as the speech recognition result.

In FIG. 1, the electronic device may be various kinds of personal computers, servers and other computing devices, such as mobile phones, smart speakers, tablet computers, in-vehicle terminals, independently deployed servers or server clusters, etc., which is not limited in the embodiment of the present application. The embodiment of the present application can be applied to various scenarios, such as search by voice, shopping guidance, intelligent navigation, etc.

It can be understood that although the speech signal in FIG. 1 is a speech signal sent out by the user within the perception range of the electronic device, the embodiment of the present application is not limited thereto. For example, the electronic device obtains a segment of speech signal from a server; for another example, the electronic device obtains a segment of speech signal from a local memory.

A speech recognition method described in an embodiment of the present application is described in detail in the following based on FIG. 1. For example, please refer to FIG. 2.

Figure 2:
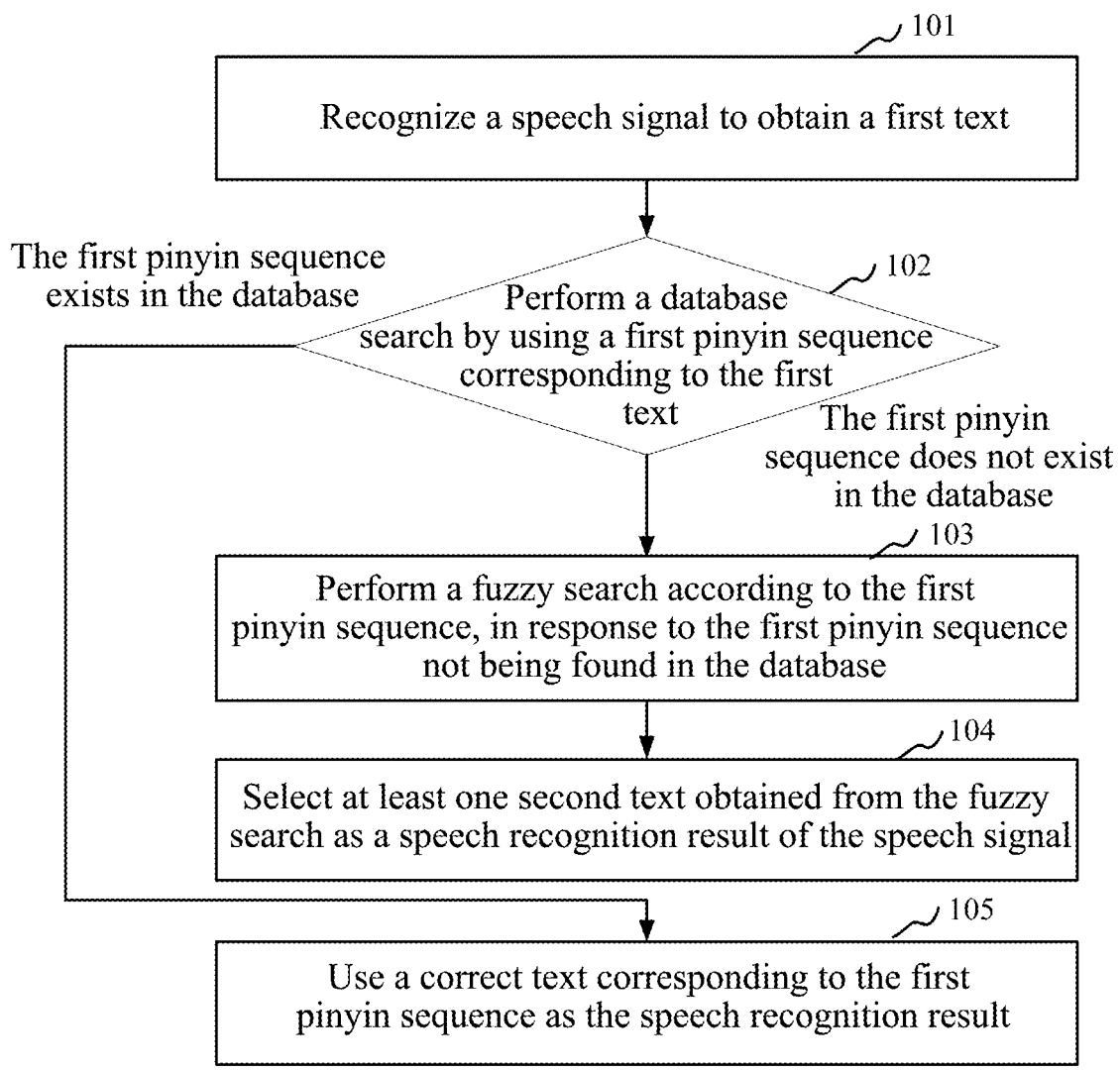
FIG. 2 is a flowchart of a speech recognition method provided by an embodiment of the present application.

FIG. 2 is a flow chart of a speech recognition method provided by an embodiment of the present application. The embodiment describes the embodiment of the present application in detail from the perspective of an electronic device. The embodiment comprises:

101, recognize an acquired speech signal to obtain a first text.

Illustratively, a user sends out a speech signal within a speech perception range of an electronic device, and the electronic device collects the speech signal and recognizes the speech signal to obtain the first text. For example, the speech signal sent out by the user is "世界之窗怎么走 (which means, how to go to the Window of the World)". Due to problems such as regional accent and search frequency, the first text is recognized by the speech recognition engine on the electronic device as "视界之窗怎么走 (which means, how to go to the window of visual field)".

102, perform a database search by using a first pinyin sequence corresponding to the first text.

Illustratively, a corresponding relationship between pinyin sequence and text, is stored in a database, and the text includes a correct text and a generalized text (if any). After recognizing the speech signal to obtain the first text, the electronic device converts the first text into the first pinyin sequence according to a correspondence relationship between Chinese characters and pinyins. During the conversion, the electronic device converts the entire first text, or extracts key parts from the first text for conversion. For example, if the first text is "可以增加空调温度么 (which means, can the temperature of the air conditioner be increased)", the first pinyin sequence is "ke yi zeng jia kong tiao wen du me" or "zeng jia kong tiao wen du".

After converting the first text into the first pinyin sequence, the electronic device searches the database to determine whether the first pinyin sequence exists in the database. If the first pinyin sequence does not exist in the database, step 103 is performed; if the first pinyin sequence exists in the database, step 105 is performed.

103, perform a fuzzy search according to the first pinyin sequence, in response to the first pinyin sequence not being found in the database.

Here, the fuzzy search is used to look up a second pinyin sequence that has at least one pinyin in the first pinyin sequence and a second text corresponding to the second pinyin sequence.

If the first pinyin sequence does not exist in the database, it means that the first text recognized by the speech recognition engine is not a correct text; or, for the speech recognition engine, the first text is an unfamiliar text, such as an unfamiliar instruction. For the former case, error correction processing is required, that is, the original intent of the user is determined from the database according to pinyin rules, and the second text is determined from the database as the speech recognition result. For the latter case, it needs to be considered whether to use the first text as a new correct text and add it to the database.

For a scenario where error correction processing is required, the electronic device performs a fuzzy search according to the first pinyin sequence corresponding to the first text to determine multiple second pinyin sequences and second texts corresponding to respective second pinyin sequences from the database, where each second pinyin sequence includes at least one pinyin in the first pinyin sequence.

Illustratively, after the speech signal sent out by the user is recognized by the speech recognition engine, the first text obtained is "先模式", and the first pinyin sequence obtained after the pinyin conversion of the first text is "xian mo shi". The electronic device finds that the pinyin sequence "xian mo shi" does not exist in the database. At this time, the electronic device performs word splitting processing on the first pinyin sequence "xian mo shi" and splits it into "xian" and "moshi". After that, the electronic device performs fuzzy matching on "xian" and "moshi", respectively.

It is assumed that the corresponding relationship between correct text and pinyin sequence stored in the database includes: 1. xi an-> 西安 (which means, Xi'an, the name of a city); 2. xi yan mo shi-> 吸烟模式 (which means, smoking mode); 3. kong tiao mo shi-> 空调模式 (which means, air conditioning mode); 4. xiu xian mo shi-> 休闲模式 (which means, casual mode). During the fuzzy matching, the electronic device finds that the pinyin containing "xian" in the database includes "xi an", and the corresponding second text is "西安"; the pinyin similar to pinyin "xian" includes "xi yan" and "xiu xian", and the corresponding second text is "休闲模式" and "吸烟模式". Then the second text determined by the electronic device according to "xian" includes 西安, 吸烟模式 and 休闲模式. Similarly, the second text determined by the electronic device according to "moshi" includes 吸烟模式, 空调模式 and 休闲模式.

104, select at least one second text obtained from the fuzzy search as a speech recognition result of the speech signal.

Continuing to use the example in step 102 above, the second text includes 西安, 吸烟模式, 休闲模式 and 空调模式. During determining the speech recognition result of the speech signal, the electronic device selects one or more of the second texts as the recognition result of the speech signal. For example, "吸烟模式" is selected as the speech recognition result.

105, use a correct text corresponding to the first pinyin sequence as the speech recognition result.

If the first pinyin sequence exists in the database, it means that the correct text corresponding to the first pinyin sequence already exists in the database. At this time, the correct text corresponding to the first pinyin sequence is used as the speech recognition result. For example, the first text obtained after the speech signal is sent out by the user is recognized by the speech recognition engine as "有座位加热 (which means, there is a seat heating)", and the first pinyin sequence obtained from the first text is "you zuo wei jia re". While in the database, the correct text corresponding to "you zuo wei jia re" is "右座位加热 (which means, heating the right seat)", therefore, the electronic device uses "右座位加热" as the speech recognition result.

In the speech recognition method provided by the embodiment of the present application, the electronic device recognizes a speech signal to obtain a first text; if the first pinyin sequence corresponding to the first text exists in the database, the correct text corresponding to the first pinyin sequence is used as the speech recognition result; otherwise, fuzzy matching is performed on the first pinyin sequence to obtain multiple second pinyin sequences and second texts corresponding to respective second pinyin sequences, and the speech recognition result is selected from the multiple second texts. In this process, the electronic device recognizes the speech signal to obtain a first text, and if the first text does not exist in the database, it means that misrecognition has occurred. At this time, the electronic device automatically corrects the misrecognition through fuzzy matching, etc. to obtain the correct speech recognition result, thereby improving the accuracy of speech recognition. Meanwhile, different databases can be set up according to the command sets of different manufacturers, and the databases can be readily adjusted, which saves manpower and material resources and has a high flexibility.

In the foregoing embodiment, before determining whether the first pinyin sequence corresponding to the first text exists in the database, the electronic device also determines whether the first text exists in the database. If the first text does not exist in the database, the solution described in the embodiment of the present application is executed, and if the first text exists in the database, whether the first text is the correct text or the generalized text continues to be determined. If the first text is the correct text, the first text will be used as the speech recognition result, and if the first text is a generalized text, the correct text corresponding to the generalized text is used as the speech recognition result.

Illustratively, after the electronic device obtains the first text, it is assumed that the first text is "先模式 (which means, former mode)". If the first text "先模式" does not exist in the database, it means that the first text has not been corrected and needs to be corrected, then the method of the present application is executed; if the first text exists in the database, it means that the first text has been corrected or the first text is originally a correct text. For example, if a generalized text "先模式" already exists in the database, the correct text "吸烟模式 (which means, smoking mode)" corresponding to the generalized text is directly used as the speech recognition result, without pinyin conversion on "先模式" and fuzzy matching. With this scheme, there is no need to perform pinyin conversion for all the first texts, which improves the speed of speech recognition.

Figure 3:
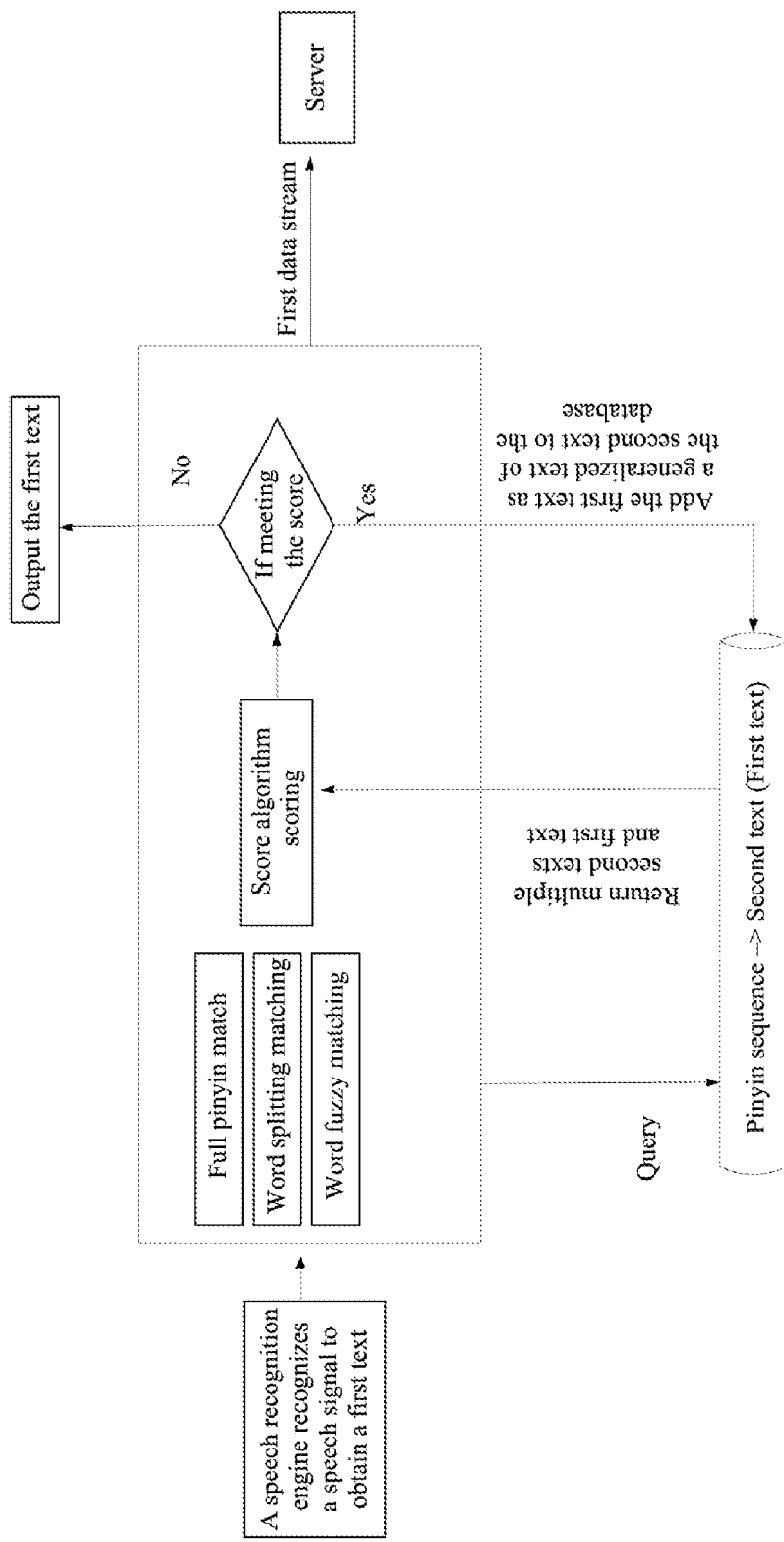
FIG. 3 is an algorithm block diagram of a speech recognition method provided by an embodiment of the present application.

FIG. 3 is an algorithm block diagram of a speech recognition method provided by an embodiment of the present application, which includes the following processes:

Firstly, a recognition result of a speech recognition engine of an electronic device enters a correction algorithm.

Illustratively, the recognition result of the speech recognition engine is the aforementioned first text.

Secondly, the electronic device uses the correction algorithm to process the first text.

Illustratively, the electronic device converts the first text into a first pinyin sequence, and performs processing according to the first pinyin sequence, which includes the following situations:

First Situation: The First Pinyin Sequence Exists in the Database.

Illustratively, the electronic device queries the database to judge whether the first pinyin sequence exists in the database. If so, the correct text corresponding to the first pinyin sequence is returned to a scoring system. For example, if the first text is "有座位加热 (which means, there is a seat heating)" and the first pinyin sequence is "you zuo wei jia re", the database returns the correct text "右座位加热 (which means, heating the right seat)" corresponding to "you zuo wei jia re" to the scoring system. If the score of "right seat heating" scored by the scoring system is full marks or exceeds a preset threshold, the first text "右座位加热" will be returned to the database, provided for the database to use "有座位加热" as a generalized text of "右座位加热". With this scheme, the purpose of updating the database is achieved.

Second Situation: The First Pinyin Sequence does not Exist in the Database.

The electronic device performs word splitting processing on the first pinyin sequence to obtain multiple pinyins, and for each pinyin of the multiple pinyins, a second pinyin sequence containing the pinyin and a second text corresponding to the second pinyin sequence are determined from the database.

Illustratively, supposing that the first pinyin sequence is "xian mo shi", which is split into "xian" and "moshi", the electronic device determines according to "xian" that the second text includes 西安, 吸烟模式 and 休闲模式. Similarly, the electronic device determines according to "moshi" that the second text includes 吸烟模式, 空调模式 and 休闲模式. With this scheme, multiple correct texts are determined through word fuzzy matching, so as to narrow the scope of matching.

After determining multiple second texts, the electronic device sends these second texts and the first text to the scoring system, and the scoring system determines the speech recognition result according to these second texts and the first text.

Illustratively, the electronic device determines a similarity between the second pinyin sequence of each second text in the multiple second texts and the first pinyin sequence to obtain multiple similarities, and then, determines a target text according to a maximum similarity among the multiple similarities.

Continuing to use the example above, the scoring system will score according to the pinyin rules, and judge the similarities of "xian mo shi" to "xian", "xi yan mo shi", "xiu xian mo shi" and "kong tiao mo shi", respectively, to get multiple similarities.

After determining the multiple similarities, the electronic device judges whether the maximum similarity among these similarities exceeds a preset threshold. If the maximum similarity is greater than or equal to the preset threshold, the speech recognition result is determined to be the second text corresponding to the maximum similarity; if the maximum similarity is lower than the preset threshold, the first text is used as the speech recognition result.

Illustratively, if among these similarities, "xian mo shi" and "xi yan mo shi" have the highest similarity and the similarity exceeds the preset threshold, then the second text corresponding to "xi yan mo shi" is used as the speech recognition result. In other words, even if the speech recognition engine of the electronic device recognizes the user's speech signal as "先模式 (which means, former mode)", after error correction, the correct speech recognition result is obtained as "吸烟模式 (which means, smoking mode)". After that, the electronic device adds the first text "先模式" to the generalization table of the second text "吸烟模式" in the database. Later, if the speech recognition engine of the electronic device recognizes "先模式" again, the correct speech recognition result can be determined as "吸烟模式" by directly querying the database, but without performing pinyin conversion. With this scheme, the entire database can be generalized through scoring rules, without manpower to cover, thereby reducing manpower costs.

If the maximum similarity is less than the preset threshold, the first text is used as the speech recognition result. Illustratively, supposing that the first text is "吸烟模式 (which means, smoking mode)" and the corresponding first pinyin sequence is "xi yan mo shi". But the pinyin sequence "xi yan mo shi" does not exist in the database. The second text obtained by word fuzzy matching includes "kong tiao mo shi" and "xian", but the scoring system finds that the similarity of "xi yan mo shi" and "kong tiao mo shi" is lower than the preset threshold and the similarity of "xi yan mo shi" and "xian" is lower than the preset threshold. At this time, the scoring system returns "吸烟模式" to the database so that the database uses "吸烟模式" as a correct text and stores the corresponding relationship between "吸烟模式" and "xi yan mo shi".

In the foregoing embodiment, if the maximum similarity is greater than or equal to the preset threshold, then, after the electronic device uses the second text corresponding to the maximum similarity as the speech recognition result of the speech signal, the electronic device further adds the first text to the generalization table of the second text corresponding to the maximum similarity, where the generalization table is used to store the generalized text of the second text corresponding to the maximum similarity, and the generalized text has the same intent as the second text. After that, the electronic device sends a first data stream to a server, and the first data stream carries the corresponding relationship among the second text corresponding to the maximum similarity, the first text and the first pinyin sequence.

Illustratively, the electronic device can synchronize the database to the server regularly, so that the server in the cloud performs integration, de-duplication, etc. on the correct texts and the generalized texts in the database reported by different electronic devices, and sends the integrated database to a corresponding vehicle model. For example, the electronic device is a in-vehicle terminal, which is configured to execute the method described in the embodiments of the present application. The in-vehicle terminal synchronizes the continuously improved database to the server in the cloud, and the server integrates the databases, etc., and sends it to other in-vehicle terminal devices. In this process, the manufacturers and models of the in-vehicle terminals at the transmitting end and the receiving end may be the same or different, which is not limited in the embodiment of the present application. With this scheme, the purpose of data sharing is achieved by synchronizing offline corrected databases to the cloud and integrating.

In the foregoing embodiment, the electronic device continuously improves the database during the process of speech recognition, and synchronizes the improved database to the cloud which performs integration, etc. However, the embodiments of the present application do not limit to this, and in other feasible implementation manners, the electronic device can also recognize a second data stream input by a user and send the second data stream to the server, where the second data stream is used to indicate a correspondence relationship between the second text and the second pinyin sequence, and the generalized text of the second text.

Illustratively, the user can directly send the corresponding relationship among the second text, the second pinyin sequence and the generalized text of the second text to the server through the terminal device without going through the local correction algorithm of the terminal. With this scheme, the purpose of flexibly providing bad cases to the server is achieved.

The foregoing describes the specific implementations of the speech recognition method mentioned in the embodiments of the present disclosure. The following are apparatus embodiments of the present disclosure, which can be used to implement the method embodiments of the present disclosure. For the details that are not disclosed in the apparatus embodiments of the present disclosure, please refer to the method embodiments of the present disclosure.

Figure 4:
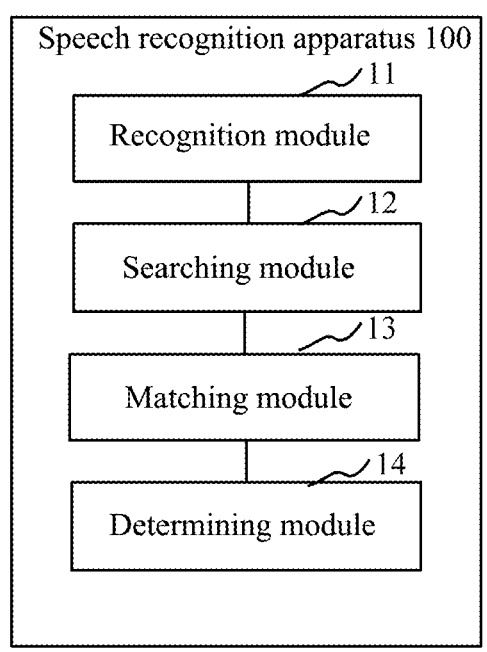
FIG. 4 is a schematic structural diagram of a speech recognition apparatus provided by an embodiment of the disclosure.

FIG. 4 is a schematic structural diagram of a speech recognition apparatus provided by an embodiment of the present disclosure. The apparatus can be integrated in or implemented by an electronic device. As shown in FIG. 4, in this embodiment, the speech recognition apparatus 100 may include:

a recognition module 11, configured to obtain a first text by recognizing an acquired speech signal;

a searching module 12, configured to perform a database search by using a first pinyin sequence corresponding to the first text;

a matching module 13, configured to perform a fuzzy search according to the first pinyin sequence in response to the first pinyin sequence not being found in the database, where a fuzzy search is used to look up a second pinyin sequence having at least one pinyin in the first pinyin sequence and a second text corresponding to the second pinyin sequence;

a determining module 14, configured to select at least one second text obtained by the fuzzy search as a speech recognition result of the speech signal.

In a feasible design, the determining module 14 is configured to determine a similarity between the second pinyin sequence corresponding to each second text of the at least one second text and the first pinyin sequence to obtain multiple similarities, and determine the speech recognition result of the speech signal from the at least one second text according to a maximum similarity among the multiple similarities.

In a feasible design, when the determining module 14 determines the speech recognition result of the speech signal from the at least one second text according to the maximum similarity among the multiple similarities, the determining module 14 is configured to: determine that the speech recognition result of the speech signal is the second text corresponding to the maximum similarity; or, determine that the first text is the speech recognition result of the speech signal if the maximum similarity is lower than the preset threshold.

Figure 5:
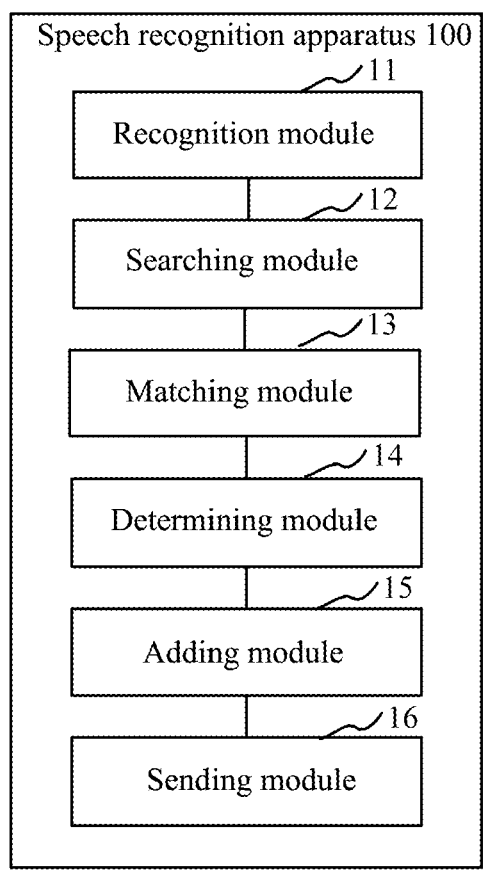
FIG. 5 is a schematic structural diagram of another speech recognition apparatus provided by an embodiment of the disclosure.

FIG. 5 is a schematic structural diagram of another speech recognition apparatus provided by an embodiment of the disclosure. Referring to FIG. 5, in a feasible design, the aforementioned speech recognition apparatus 100 further includes:

an adding module 15, configured to add the first text to a generalization table of the second text corresponding to the maximum similarity, after the determining module 14 determines that the second text corresponding to the maximum similarity is the speech recognition result of the speech signal, if the maximum similarity is greater than or equal to the preset threshold, where the generalization table is used to store a generalized text of the second text corresponding to the maximum similarity, and the generalized text has a same intent as the second text.

Referring again to FIG. 5, in a feasible design, the above-mentioned speech recognition apparatus 100 further includes:

a sending module 16, configured to send a first data stream to a server, where the first data stream carries a corresponding relationship among the second text corresponding to the maximum similarity, the first text and the first pinyin sequence.

In a feasible design, the recognition module 11 is further configured to recognize a second data stream input by a user, where the second data stream is used to indicate a correspondence relationship between the second text and the second pinyin sequence, and the generalized text of the second text; and the sending module 16 is configured to send the second data stream to the server.

In a feasible design, after the recognition module 11 recognizes the speech signal to obtain the first text, the determining module 14 is further configured to determine that the recognition result of the speech signal is a third text corresponding to the first pinyin sequence, if the searching module 12 finds the first pinyin sequence in the database.

In a feasible design, the determining module 14 is further configured to determine that the first text does not exist in the database, before the matching module 13 performs the fuzzy search according to the first pinyin sequence in response to the first pinyin sequence not being found in the database.

The speech recognition apparatus provided in the embodiment of the present disclosure can be used in the method executed in the above embodiment, and their implementation principles and technical effects are similar, which will not be repeated here.

According to an embodiment of the present application, the present application also provides an electronic device and a readable storage medium.

Figure 6:
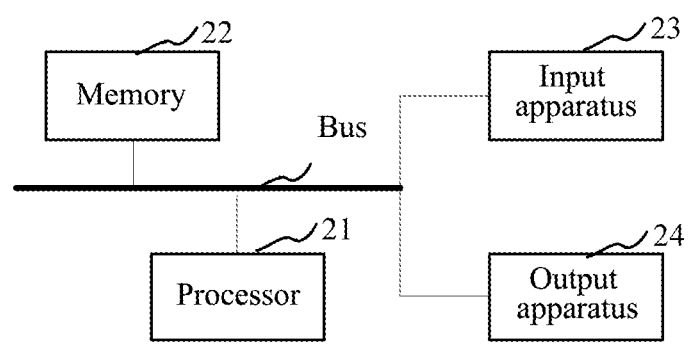
FIG. 6 is a block diagram of an electronic device used to implement a speech recognition method of an embodiment of the present disclosure.

FIG. 6 is a block diagram of an electronic device used to implement the speech recognition method of the embodiments of the present disclosure. The electronic device is intended to represent various forms of digital computers, such as laptop computers, desktop computers, workstations, personal digital assistants, servers, blade servers, mainframe computers and other suitable computers. The electronic device can also represent various forms of mobile devices, such as personal digital assistant, cellular phones, smart phones, wearable devices and other similar computing devices. The components shown herein, their connections and relationships and their functions are merely examples, and are not intended to limit the implementation of the present application described and/or required herein.

As shown in FIG. 6, the electronic device includes: one or more processors 21, a memory 22 and interfaces for connecting various components, including a high-speed interface and a low-speed interface. The various components are connected to each other by using different buses, and can be installed on a common motherboard or installed in other ways as required. The processor may process instructions executed in the electronic device, including instructions stored in or on the memory to display graphical information of a GUI on an external input/output device (such as a display device coupled to an interface). In other embodiments, if necessary, multiple processors and/or multiple buses can be used with multiple memories. Similarly, multiple electronic devices can be connected, and each one provides a necessary operation (for example, as a server array, a group of blade servers or a multi-processor system). FIG. 6 is shown by taking one processor 21 as an example.

The memory 22 is a non-transitory computer-readable storage medium provided by the present application, where the memory stores instructions that can be executed by at least one processor, so that the at least one processor executes the speech recognition method provided by the present application. The non-transitory computer-readable storage medium of the present application stores computer instructions, which are used to cause a computer execute the speech recognition method provided by the present application.

As a non-transitory computer-readable storage medium, the memory 22 can be used to store non-transitory software programs, non-transitory computer-executable programs and modules, such as program instructions/modules corresponding to the speech recognition method in the embodiments of the present application (for example, the recognition module 11, searching module 12, the matching module 13 and the determining module 14 as shown in FIG. 4, and the adding module 15 and the sending module 16 described in FIG. 5). The processor 21 executes various functional applications and data processing, that is, implements the speech recognition method in the above method embodiments, by running the non-transient software programs, instructions and modules stored in the memory 22.

The memory 22 may include a program storage area and a data storage area, where the program storage area may store an operating system and an application program required by at least one function; the data storage area may store data created by the use of an electronic device and the like. In addition, the memory 22 may include a high-speed random-access memory and may also include a non-transitory memory, such as at least one magnetic disk storage device, a flash memory device or other non-transitory solid-state storage devices. In some embodiments, the memory 22 may optionally include memories provided remotely with respect to the processor 21, and these remote memories may be connected to the electronic device through a network. Examples of the aforementioned network includes but is not limited to the Internet, a corporate intranet, a local area network, a mobile communication network and a combination thereof.

The electronic device may further include: an input apparatus 23 and an output apparatus 24. The processor 21, the memory 22, the input apparatus 23 and the output apparatus 24 may be connected by a bus or other means. In FIG. 6, the connection by a bus is taken as an example.

The input apparatus 23 can receive input digital or character information, and generate key signal input related to the user settings and function control of the electronic device, such as a touch screen, a keypad, a mouse, a track pad, a touch pad, a pointer, one or more mouse buttons, a trackball, a joysticks and other input apparatus. The output apparatus 24 may include a display device, an auxiliary lighting apparatus (for example, an LED), a tactile feedback apparatus (for example, a vibration motor) and the like. The display device may include, but is not limited to, a liquid crystal display (LCD), a light emitting diode (LED) display and a plasma display. In some embodiment modes, the display device may be a touch screen.

Various implementation modes of the systems and techniques described herein can be implemented in digital electronic circuit systems, integrated circuit systems, application specific ASICs (application specific integrated circuits), computer hardware, firmware, software and/or combinations thereof. These various implementation modes may include: being implemented in one or more computer programs which may be executed and/or interpreted on a programmable system including at least one programmable processor. The programmable processor may be a special or general purpose programmable processor that can receive data and instructions from a storage system, at least one input apparatus and at least one output apparatus, and transmit data and instructions to the storage system, the at least one input apparatus and the at least one output apparatus.

These computer programs (also called programs, software, software applications or codes) include machine instructions of programmable processors, and can be implemented by using high-level process and/or object-oriented programming languages, and/or assembly/machine language. As used herein, the terms "machine-readable medium" and "computer-readable medium" refer to any computer program product, device and/or apparatus used to provide machine instructions and/or data to a programmable processor (for example, magnetic disks, optical disks, memories and programmable logic devices (PLD)), including a machine-readable medium that receives machine instructions as machine-readable signals. The term "machine-readable signal" refers to any signal used to provide machine instructions and/or data to a programmable processor.

In order to provide interaction with a user, the systems and techniques described here can be implemented on a computer that includes: a display device for displaying information to the user (for example, a CRT (cathode ray tube) or LCD (liquid crystal display) monitor); and a keyboard and a pointing apparatus (for example, a mouse or a trackball), through which the user can provide input to the computer. Other types of apparatuses can also be used to provide interaction with the user; for example, a feedback provided to the user can be any form of sensing feedback (for example, visual feedback, auditory feedback or tactile feedback); and can be in any form (including acoustic input, voice input or tactile input) to receive input from the user.

The systems and technologies described herein can be implemented in a computing system that includes a back-end component (for example, as a data server), or a computing system that includes a middleware component (for example, an application server), or a computing system that includes a front-end component (for example, a user computer with a graphical user interface or a web browser, through which the user can interact with the embodiment modes of the systems and technologies described herein), or a computing system that includes any combination of such back-end component, middleware component or front-end component. The components of the system can be connected to each other through any form or medium of digital data communication (for example, a communication network). Examples of communication networks include: a local area network (LAN), a wide area network (WAN) and the Internet.

The computer system may include clients and servers. The client and server are generally far away from each other and usually interact through a communication network. The relationship between the client and the server is generated through computer programs that run on corresponding computers and have a client-server relationship with each other.

An embodiment of the present application also provides a speech recognition method, including: recognizing a speech signal to obtain a first text; performing a fuzzy matching on the first text to obtain multiple correct texts, each of the multiple correct texts containing at least one word that has a same pinyin as the first text; determining a target text from the multiple correct texts and using the target text as a speech recognition result of the speech signal.

For the specific implementation principle of this embodiment, please refer to the description of the above embodiments, which will not be repeated here.

According to the technical solution of embodiments of the present application, the electronic device recognizes a speech signal to obtain a first text, and if the first pinyin sequence corresponding to the first text exists in a database, a correct text corresponding to the first pinyin sequence is used as a speech recognition result; otherwise, a fuzzy matching is performed on the first text to obtain multiple correct texts, and a target text is determined from the multiple correct texts. In this process, the electronic device recognizes a speech signal to obtain a first text, and if the first text does not exist in the database, it means misrecognition has occurred. At this time, the electronic device automatically corrects the misrecognition through fuzzy matching and etc. to obtain the correct speech recognition result, thereby improving the accuracy of speech recognition. Meanwhile, different databases can be set up according to command sets of different manufacturers, and the databases can be adjusted readily, which saves manpower and material resources and has a high flexibility.

It should be understood that the various forms of processes shown above can be used to reorder, add or delete steps. For example, the steps described in the present application can be executed in parallel, sequentially or in a different order, which is not limited herein, as long as the desired result of the technical solution disclosed in the present application can be achieved.

The foregoing specific embodiments do not constitute a limitation on the protection scope of the present application. Those skilled in the art should understand that various modifications, combinations, sub-combinations and substitutions can be made according to design requirements and other factors. Any modifications, equivalent substitutions, improvements and etc. made within the spirit and principles of the present application shall be included in the scope of protection of the present application.

What is claimed is:

1. A speech recognition method, comprising:
   obtaining a first text by recognizing an acquired speech signal;
   performing a database search by using a first pinyin sequence corresponding to the first text;
   performing a fuzzy search according to the first pinyin sequence in response to the first pinyin sequence not being found in the database, wherein the fuzzy search is used to look up a second pinyin sequence having at least one pinyin in the first pinyin sequence and a second text corresponding to the second pinyin sequence from the database; and
   selecting at least one second text obtained by the fuzzy search as a speech recognition result of the speech signal,
   wherein the selecting at least one second text obtained by the fuzzy search as a speech recognition result of the speech signal comprises:
   determining a similarity between the second pinyin sequence corresponding to each second text of the at least one second text and the first pinyin sequence to obtain at least one similarity; and
   determining the speech recognition result of the speech signal from the at least one second text according to a maximum similarity among the at least one similarity
   wherein the determining the speech recognition result of the speech signal from the at least one second text according to a maximum similarity among the at least one similarity comprises:
   determining that the second text corresponding to the maximum similarity is the speech recognition result of the speech signal, in a case that the maximum similarity is greater than or equal to a preset threshold; or,
   determining that the first text is the speech recognition result of the speech signal, in a case that the maximum similarity is less than the preset threshold.

2. The method according to claim 1, after the determining that the second text corresponding to the maximum similarity is the speech recognition result of the speech signal, in a case that the maximum similarity is greater than or equal to a preset threshold, further comprising:
   adding the first text to a generalization table of the second text corresponding to the maximum similarity, wherein the generalization table is used to store a generalized text of the second text corresponding to the maximum similarity, and the generalized text has a same intent as the second text.

3. The method according to claim 2, further comprising:
   sending a first data stream to a server, wherein the first data stream carries a corresponding relationship among the second text corresponding to the maximum similarity, the first text and the first pinyin sequence.

4. The method according to claim 1, further comprising:
   recognizing a second data stream input by a user, wherein the second data stream is used to indicate a correspondence relationship between the second text and the second pinyin sequence, and a generalized text of the second text; and
   sending the second data stream to a server.

5. The method according to claim 1, after the performing a database search by using a first pinyin sequence corresponding to the first text, further comprising:
   determining that the speech recognition result of the speech signal is a third text corresponding to the first pinyin sequence, in a case that the first pinyin sequence is found in the database.

6. The method according to claim 1, before the performing a fuzzy search according to the first pinyin sequence, in response to the first pinyin sequence not being found in the database, further comprising:
   determining that the first text does not exist in the database.

7. A speech recognition apparatus, comprising:
   at least one processor; and
   a memory, communicatively connected with the at least one processor; wherein
   the memory stores instructions executable by the at least one processor, and the at least one processor when executing the instructions, is configured to:
   obtain a first text by recognizing an acquired speech signal;
   perform a database search by using a first pinyin sequence corresponding to the first text;
   perform a fuzzy search according to the first pinyin sequence in response to the first pinyin sequence not being found in the database, wherein the fuzzy search is used to look up a second pinyin sequence having at least one pinyin in the first pinyin sequence and a second text corresponding to the second pinyin sequence from the database;
   select at least one second text obtained by the fuzzy search as a speech recognition result of the speech signal,
   wherein the at least one processor is configured to determine a similarity between the second pinyin sequence corresponding to each second text of the at least one second text and the first pinyin sequence to obtain at least one similarity, and determine, according to a maximum similarity among the at least one similarity, the speech recognition result of the speech signal from the at least one second text
   wherein when determining the speech recognition result of the speech signal from the at least one second text according to the maximum similarity among the at least one similarity, the at least one processor is configured to: determine that the speech recognition result of the speech signal is the second text corresponding to the maximum similarity in a case that the maximum similarity is greater than or equal to a preset threshold; or, determine that the first text is the speech recognition result of the speech signal in a case that the maximum similarity is lower than the preset threshold.

8. The apparatus according to claim 7, wherein the at least one processor is further configured to add the first text to a generalization table of the second text corresponding to the maximum similarity, after it is determined that the second text corresponding to the maximum similarity is the speech recognition result of the speech signal, in a case that the maximum similarity is greater than or equal to the preset threshold, wherein the generalization table is used to store a generalized text of the second text corresponding to the maximum similarity, and the generalized text has a same intent as the second text.

9. The apparatus according to claim 8, wherein the at least one processor is further configured to send a first data stream to a server, wherein the first data stream carries a corresponding relationship among the second text corresponding to the maximum similarity, the first text and the first pinyin sequence.

10. The apparatus according to claim 7, wherein the at least one processor is further configured to
recognize a second data stream input by a user, wherein the second data stream is used to indicate a correspondence relationship between the second text and the second pinyin sequence, and a generalized text of the second text; and
send the second data stream to a server.

11. The apparatus according to claim 7, wherein the at least one processor is further configured to determine that the speech recognition result of the speech signal is a third text corresponding to the first pinyin sequence, in a case that the first pinyin sequence is found in the database.

12. The apparatus according to claims 7, wherein the at least one processor is further configured to determine that the first text does not exist in the database, before the at least one processor performs a fuzzy search according to the first pinyin sequence in response to the first pinyin sequence not being found in the database.

13. A non-transitory computer-readable storage medium storing computer instructions, wherein the computer instructions are used to enable a computer to execute the method according to claim 1.

14. A speech recognition method, comprising:
recognizing a speech signal to obtain a first text;
performing a fuzzy matching according to a first pinyin sequence corresponding to the first text to obtain multiple second pinyin sequences and second texts corresponding to the second pinyin sequences from a database, wherein each of the second pinyin sequence has at least one pinyin in the first pinyin sequence; and
determining a speech recognition result of the speech signal from the multiple second texts,
wherein the determining a speech recognition result of the speech signal from the multiple second texts comprises:
determining a similarity between the second pinyin sequence corresponding to each second text of the multiple second texts and the first pinyin sequence to obtain multiple similarities; and
determining the speech recognition result of the speech signal from the multiple second texts according to a maximum similarity among the multiple similarities;
wherein the determining the speech recognition result of the speech signal from the multiple second texts according to a maximum similarity among the multiple similarities comprises:
determining that the second text corresponding to the maximum similarity is the speech recognition result of the speech signal, in a case that the maximum similarity is greater than or equal to a preset threshold; or,
determining that the first text is the speech recognition result of the speech signal, in a case that the maximum similarity is less than the preset threshold.

* * * * *